United States Patent
Demetri (12) 
(10) Patent No.: US 6,280,866 B1
(45) Date of Patent: Aug. 28, 2001

(54) FUEL CELL FLOW DISTRIBUTOR DESIGN FOR IMPROVING DURABILITY AND PERFORMANCE

(75) Inventor: Elia P. Demetri, Woburn, MA (US)

(73) Assignee: Northern Research & Engineering Corporation, Woburn, MA (US)

( * ) Notice: Subject to any disclaimer, the term of this patent is extended or adjusted under 35 U.S.C. 154(b) by 0 days.

(21) Appl. No.: 09/255,768

(22) Filed: Feb. 23, 1999

(51) Int. Cl.$^7$ .................................................. H01M 8/04
(52) U.S. Cl. ............................................................ 429/26
(58) Field of Search ................................... 429/26, 34–39

(56) References Cited

U.S. PATENT DOCUMENTS

| | | |
|---|---|---|
| 3,432,357 | 3/1969 | Dankese . |
| 3,573,104 | 3/1971 | Snyder, Jr. et al. . |
| 5,175,063 | 12/1992 | Ishihara et al. . |
| 5,185,219 | 2/1993 | Ishihara et al. . |
| 5,213,910 | 5/1993 | Yamada . |
| 5,328,777 | 7/1994 | Bentz et al. . |
| 5,405,712 | 4/1995 | Yoshimura et al. . |
| 5,486,428 | 1/1996 | Gardner et al. . |
| 5,543,240 | 8/1996 | Lee et al. . |
| 5,565,072 | 10/1996 | Faita et al. . |
| 5,686,199 | 11/1997 | Cavalca et al. . |
| 5,691,075 | * 11/1997 | Batawi . |
| 6,030,718 | * 2/2000 | Fuglevand et al. . |

FOREIGN PATENT DOCUMENTS

| | | |
|---|---|---|
| 19636903 | 1/1998 | (DE) . |
| 0369059 | 5/1990 | (EP) . |

\* cited by examiner

*Primary Examiner*—Carol Chaney
*Assistant Examiner*—Susy Tsang
(74) *Attorney, Agent, or Firm*—Michael Best & Friedrich LLP (57) ABSTRACT

A fuel cell includes a cathode having a first surface and a second surface, and an anode having a first surface and a second surface, with the anode underlying the cathode so that the first surface of the anode faces the second surface of the cathode. The fuel cell includes an electrolyte sandwiched between the first surface of the anode and the second surface of the cathode and a fuel distributor underlying the anode for directing a flow of fuel over the second surface of the anode. The fuel cell also has an oxidizing agent flow distributor having a plurality of flow path levels, the oxidizing agent flow distributor being adapted for passing an oxidizing agent toward the first surface of the cathode and transferring heat from the first surface of the cathode to the oxidizing agent as the oxidizing agent moves toward the cathode so that the temperature of the oxidizing agent reaching the first surface of the cathode is increased for minimizing thermal stresses upon the fuel cell.

8 Claims, 8 Drawing Sheets

(c.) VIEW B - B SHOWING MULTIPASS FLOW PATH

(b.) VIEW A - A

FIGURE 4

(c.) VIEW B - B SHOWING MULTIPASS FLOW PATH

FUEL CELL FLOW DISTRIBUTOR DESIGN FOR IMPROVING DURABILITY AND PERFORMANCE

FIELD OF THE INVENTION

The present invention relates to a fuel cell and more specifically relates to a fuel cell having a flow distributor that reduces thermal stress upon the fuel cell structure.

BACKGROUND OF THE INVENTION

Fuel cells offer considerable promise as clean, efficient and direct sources of electric power. Recent technological advances in the design of fuel cells have developed units that may be sold in the marketplace. In addition, various economic and institutional trends are increasing the potential market value of fuel cells. This is particularly true for stationary-power applications where the inherent characteristics of the fuel cell offer distinct advantages over more conventional systems.

Although recent development efforts have successfully overcome many of the existing barriers to practical implementation of the fuel cell, a number of significant technical problems must be satisfactorily resolved. One specific problem deserving attention concerns the occurrence of thermal discontinuities within the body of the fuel cell structure and the impact of these non-uniformities on the durability and efficiency of the cell. This deviation from ideal isothermal conditions is primarily due to the fact that the oxidizing agent, such as an air stream, enters the fuel cell at a temperature that is significantly below the operating temperature of the cell. As a result, the air stream heats up as it flows through the fuel cell module. The nonDocket uniformity problems are compounded by the fact that the heat generated by the fuel cell is also nonuniform due to the variations in the composition of the fuel and air streams from the inlet to the outlet of the cell.

Figure 1:
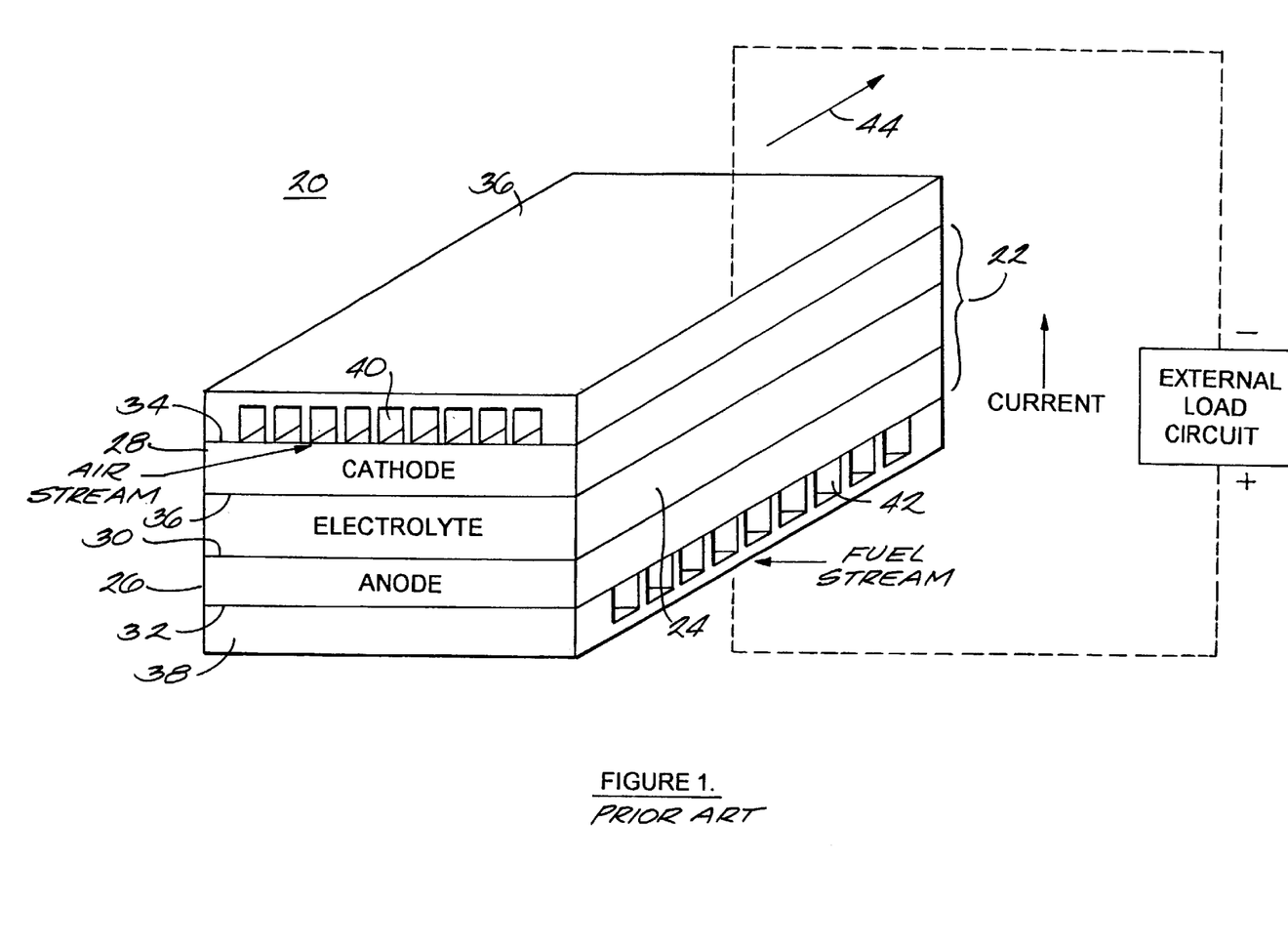
FIG. 1 shows a perspective view of a prior art fuel cell including an air flow distributor and a fuel flow distributor.

FIG. 1 shows the major features of a prior art fuel cell module 20. The fuel cell shown in FIG. 1 has a rectilinear planar geometry and a cross-flow orientation of the air and fuel streams. A fuel cell design having a planar geometry is desirable because the design facilitates assembling together individual fuel cell modules to provide a larger fuel cell system. The cross-flow arrangement of the air and fuel streams simplifies the design of the inlet and outlet distribution headers required to physically separate the two streams. One major disadvantage of this arrangement, however, is that it leads to a more complex and undesirable two dimensional distribution of temperature, current density, and heat generation in the fuel cell module.

The basic components of a fuel cell 20 include a core section 22 having an electrolyte layer 24 that is sandwiched between the fuel electrode 26, typically referred to as the anode, and the air electrode 28, typically referred to as the cathode. The anode 26 has a first surface 30 and a second surface 32, while the cathode 28 also has a first surface 34 and a second surface 36. The electrolyte layer 24 lies between the second surface 36 of the cathode 28 and the first surface 30 of the anode 26. The fuel cell 20 also includes an air flow distributor 36 in contact with the cathode 28 and a fuel flow distributor 38 in contact with the anode 26. The air flow distributor 36 and the fuel flow distributor 38 serve as current collectors and contain respective passages 40 and 42 which direct the flow of the two air and fuel streams over the electrode surfaces. The chemical process occurring in the fuel cell 20 consists of oxidation of the gaseous fuel. The oxidation reaction occurs on the first surface 34 of the cathode 28 where the reactive fuel species (usually $H_2$) are oxidized to the product species ($H_2O$). The required source of oxygen is provided by the air stream through a mechanism which depends upon the particular type of electrolyte being utilized. When using solid oxide fuel cells, oxygen ions are generated at the surface of the cathode and migrate through the electrolyte to the anode. The electrochemical reaction generates an electric current through a connected external load and produces an accompanying quantity of heat within the fuel cell.

Figure 2A:
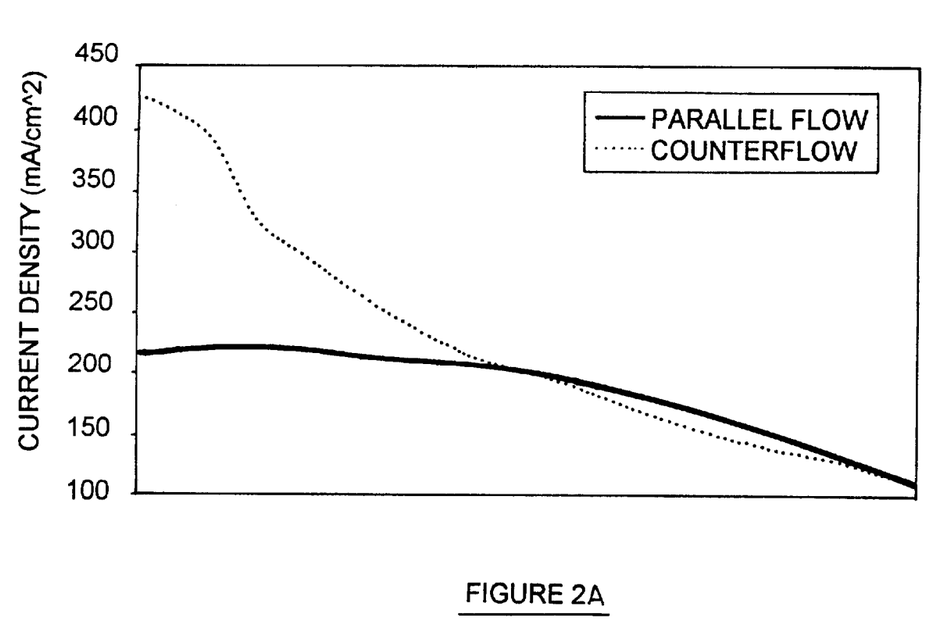
FIG. 2A shows a graph depicting the typical spatial distribution of current density for parallel flow and counterflow fuel/oxidizer arrangements of a representative fuel cell module.
Figure 2B:
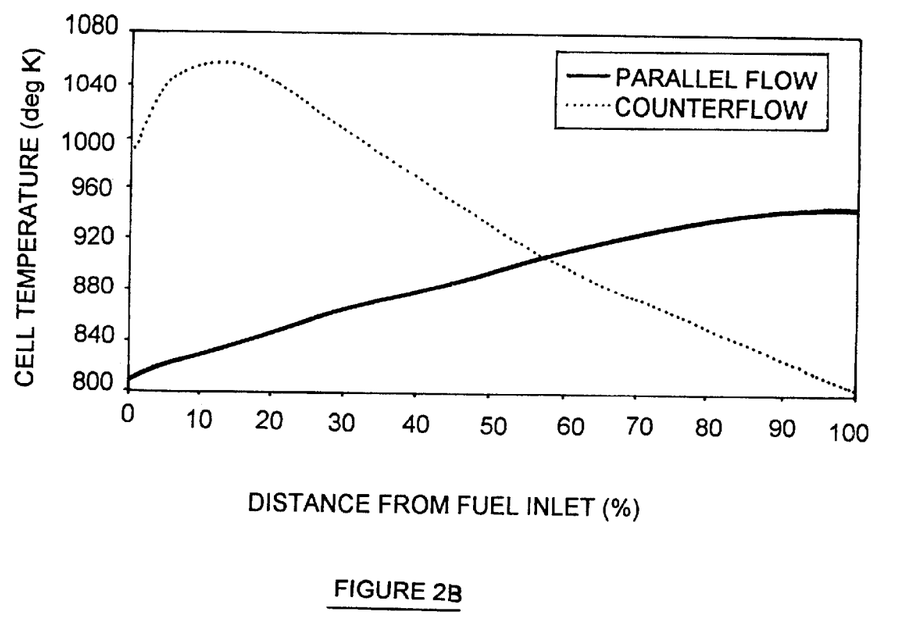
FIG. 2B shows a graph depicting the corresponding spatial distribution of material temperature in the cell structure for parallel flow and counterflow fuel/oxidizer arrangements of a representative fuel cell module.

Fuel cells are designed to operate at the highest temperature possible because the efficiency of a typical cell increases as the operating temperature thereof increases. In most designs, the excess heat generated within the fuel cell during normal operation thereof must be continuously removed from the cell to maintain the internal temperature at an acceptable steady state level. In most designs, the waste heat is carried away primarily by the depleted air stream 44. The fuel stream also contributes to heat removal. However, the fuel stream removes significantly less heat than does the air stream because the mass flow rate of the fuel stream is lower and the inlet temperature of the fuel stream is usually higher than the air stream. As a result, temperature discontinuities and/or non-uniformities typically develop within the fuel cell. FIGS. 2A and 2B show two graphs comparing the potential magnitude of this effect for parallel flow and counterflow arrangements using a molten carbonate fuel cell. The information depicted in the graphs was presented in a report authored by T.L. Wolf and G. Wilemski, entitled "Molten Carbonate Fuel Cell Performance Model," Journal of Electrochemical Society: ELECTROCHEMICAL SCIENCE AND TECHNOLOGY, Vol. 130, No. 1, pp. 48–55, Jan. 1983. The data presented are calculated analytical results for a representative set of conditions for the simple case where both streams enter at a temperature of 800°K. As can be seen, the spatial profiles of both cell temperature and waste heat (proportional to current density) can be very steep. Comparable variations in two dimensions would be obtained for cross-flow geometries.

The prior art fuel cell shown in FIG. 1 typically produces significant temperature discontinuities or non-uniformities within the body of the fuel cell. Significant temperature non-uniformities within fuel cells are highly undesirable for at least two Who reasons. First, large temperature gradients within the cell module can lead to excessive levels of thermal stress and premature component failure. Secondly, the temperature of the cell affects the achievable current density and the efficiency of the cell. As a result, if portions of the cell are at temperatures below the desired level, these areas may produce a potential loss in both output and efficiency compared to the ideal isothermal operating condition. In accordance with certain principles, the temperature non-uniformity condition may be at least partially alleviated by removing the waste heat as it is formed and transferring it to the air stream so as to preheat the air before it comes into contact with the active surface of the cathode portion of the cell.

There have been a number of proposed solutions to the above-identified problems. One method includes preheating the air stream. The preheating method involves utilizing a recuperator for transferring heat from the high temperature depleted air stream being discharged from the fuel cell to the fresh air stream entering the fuel cell. However, in order to insure that the temperature rise through the fuel cell is small enough the total air flow rate would have to increase substantially. This would alter the overall stoichiometry of the system and would require a corresponding increase in blower power associated with providing the higher flow rate.

Another alternative method involves embedding heat pipes in the fuel cell to provide conductive paths for transferring heat to the air stream before it enters the inlet. However, the high operating temperatures of fuel cells would require that the heat pipes include liquid metal, a rather exotic and costly design. In addition, the task of incorporating heat pipes without compromising the basic function of the fuel cell is most likely too complex to be useful.

Thus, there is a need for a fuel cell that has a simple, functional design and that solves the temperature uniformity problems discussed above. Specifically, there is a need for a fuel cell having a flow distributor that effectively transfers heat from His the active electrode surface of the fuel cell to the incoming air stream in a direction substantially away from the surface so that the temperature of the incoming air stream reaches the temperature of the active electrode surface before the air stream actually contacts the surface. As a result, planar temperature gradients in the electrode, which can lead to undesirable thermal stresses in the material, will be minimized because convective heat transfer at the surface is essentially eliminated.

SUMMARY OF THE INVENTION

In certain preferred embodiments of the present invention, a fuel cell includes a fuel electrode, such as an anode, having a top surface and a bottom surface, and an air electrode, such as a cathode, having a top surface and a bottom surface. The anode preferably underlies the cathode so that the top surface of the anode faces the bottom surface of the cathode. The fuel cell also includes an electrolyte sandwiched between the bottom surface of said cathode and the top surface of the anode. The cell may include a fuel distributor underlying the anode for directing a flow of fuel over the bottom surface of the anode and an oxidizing agent flow distributor having two or more layers. The oxidizing agent flow distributor is preferably adapted for passing an oxidizing agent toward the first surface of the cathode. The oxidizing agent flow distributor is also adapted for transferring heat directly from the first surface of the cathode to the oxidizing agent as the oxidizing agent moves toward the anode so that the temperature of the oxidizing agent upon reaching the first surface of the cathode is substantially similar to the temperature at the first surface of the cathode. As will be described in more detail below, raising the temperature of the incoming air stream so that it is substantially similar to the temperature of the cathode minimizes thermal discontinuities between the air stream and the fuel cell, thereby minimizing thermal stresses upon the fuel cell.

In certain preferred embodiments, the oxidizing agent flow distributor includes a top level flow path remote from the first surface of the cathode and a bottom level flow path adjacent the first surface of the cathode. The top level flow path preferably overlies the bottom level flow path. The top and bottom level flow paths are in fluid communication with one another, whereby the bottom level flow path directs the oxidizing agent into intimate contact with the fuel at the first surface of the cathode so that the oxidizing agent and the fuel react with one another for generating heat at the first surface of the cathode. The oxidizing agent flow distributor may also include an inlet in communication with the top level flow path for receiving the oxidizing agent therein and an outlet in communication with the bottom level flow path for discharging the oxidizing agent from the flow distributor. The oxidizing agent is discharged from the fuel cell after it has flowed across the first surface of the cathode.

In certain preferred embodiments, the oxidizing agent flow distributor includes one or more intermediate openings so that the top and bottom level flow paths are in fluid communication with one another through the one or more openings. The oxidizing agent flow distributor may also include one or more intermediate level flow paths between the top level flow path and the bottom level flow path. The one or more intermediate level flow paths are preferably in fluid communication with the top and bottom level flow paths through one or more openings. In certain preferred embodiments, the oxidizing agent enters the top level flow path and flows laterally back and forth in a multi-pass arrangement through each of the succeeding layers so that when the oxidizing agent reaches the final or bottom flow level, the oxidizing agent flows through the bottom flow level and across the first surface of the cathode for reacting with the fuel and generating heat.

In certain embodiments the flow levels are stacked one atop the other with the flow levels substantially parallel to one another and parallel to the first surface of the cathode. Adjacent flow levels are preferably separated from one another by dividers, such as parting plates. The respective parting plates preferably lie in parallel planes which are substantially parallel to one another. Each flow level may also include an array of fins extending between the parting plates. The fins may be arrayed in a substantially vertical configuration. During operation of the fuel cell, the heat generated at the first surface of the cathode is transferred to the oxidizing agent stream as it flows through the multiple layers of the flow distributor structure. The heat generated at the first surface of the cathode may be transferred by conduction through the fins connecting the adjacent flow levels and by radiation between the facing parting-plate walls of the various flow levels.

In certain embodiments, each flow level has an opening at one end thereof which is in fluid communication with the adjacent flow level for passing the air stream from one level to the next. In other embodiments, each parting plate may include a plurality of perforations or apertures for allowing the air stream entering the top flow layer to flow downward from one layer to the next toward the first surface of the cathode.

DETAILED DESCRIPTION OF PREFERRED EMBODIMENTS

Figure 3:
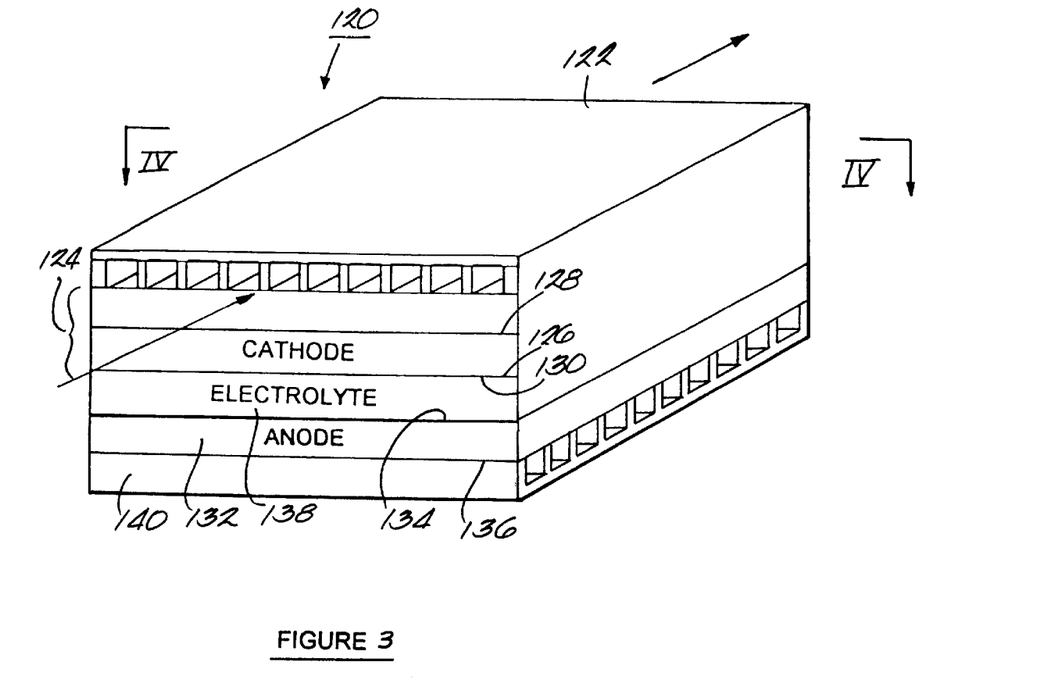
FIG. 3 shows a perspective view of a fuel cell including an oxidizing agent flow distributor in accordance with preferred embodiments of the present invention.
Figure 4:
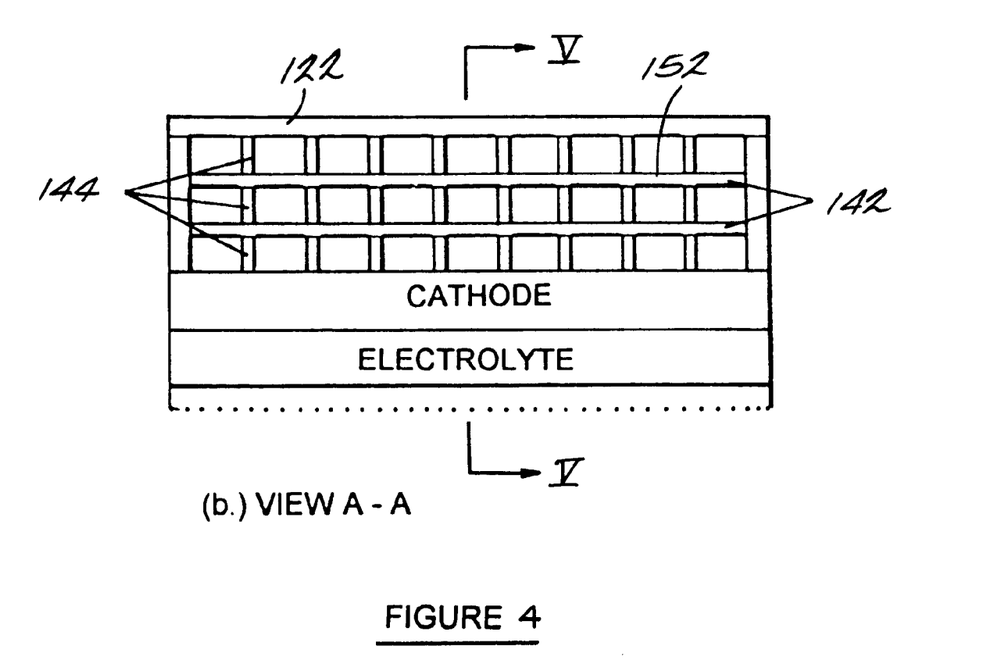
FIG. 4 shows a cross-sectional view of the fuel cell of FIG. 3 along line IV—IV.
Figure 5:
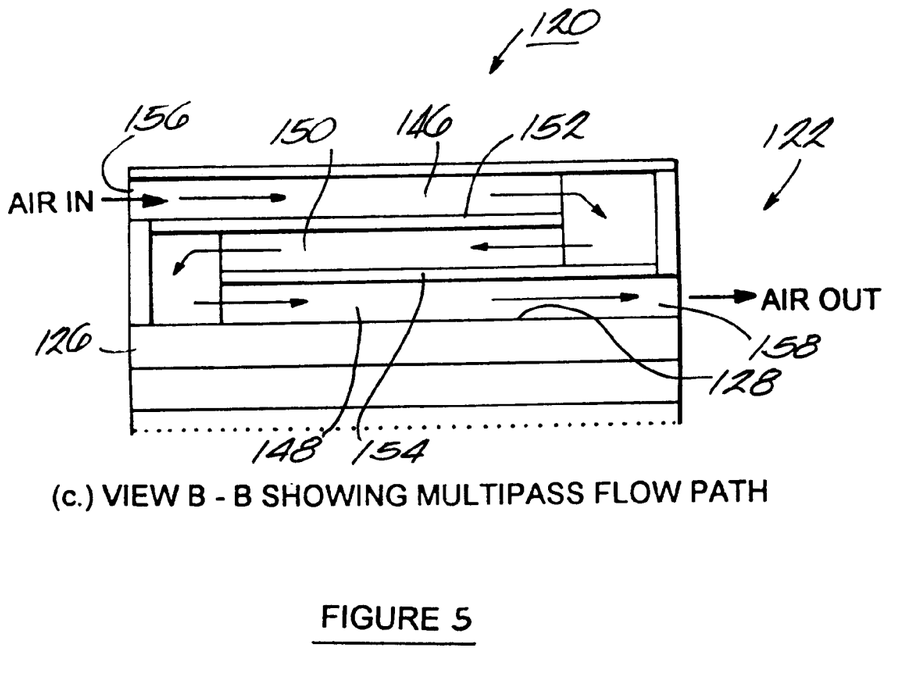
FIG. 5 shows a cross-sectional view of the fuel cell of FIG. 4 along line IV—IV.

FIG. 3 shows a fuel cell 120 including an oxidizing agent flow distributor 122 in accordance with certain preferred embodiments of the present invention. The fuel cell 120 preferably has a core 124 including a cathode 126 with a first surface 128 and a second surface 130, an anode 132 having a first surface 134 and a second surface 136, and an electrolyte 138 sandwiched between the second surface 130 of the cathode 126 and the first surface 134 of the anode 132. The fuel cell 120 includes a fuel distributor 140 for passing a fuel over the second surface 136 of the anode 132. Referring to FIGS. 4 and 5, the oxidizing agent flow distributor 122 preferably has at least two flow paths for passing the air stream or oxidizing agent toward the first surface of the cathode 126. The oxidizing agent flow distributor 122 also preferably includes parting plates 142 dividing the various flow level paths and a plurality of fins 144 extending between adjacent parting plates. Referring to FIG. 5, the oxidizing agent flow distributor 122 has a top level flow path 146 remote from the first surface of the cathode 126, a bottom level flow path 148 adjacent the first surface of the cathode 126 and an intermediate level flow path 150 between the top and bottom level flow paths. A first parting plate 152 separates the top and intermediate flow level paths 146 and 150 and a second parting plate 154 separates the intermediate and bottom level flow paths 150 and 148. As shown in FIG. 4, each flow path level includes a plurality of fins 144 extending between adjacent parting plates 142. Each flow level also includes at least one opening for providing fluid communication between adjacent flow levels. Referring to FIG. 5, the flow distributor also includes an inlet 156 in fluid communication with the top flow level 146 for introducing the air stream into the flow distributor 122 and an outlet 158 at another end of the flow distributor 122 for discharging the air stream from the flow distributor after the air stream has passed over the first surface 128 of the cathode 126. During operation of the fuel cell 120, the air stream enters through the inlet 156 in the top level flow path 146 and flows longitudinally back and forth in a multi-pass arrangement through each of the succeeding flow levels. The air stream is warmed as it moves back and forth through the various flow path levels. When the air stream reaches the bottom level flow path 148, the second parting plate 154 and fins 144 direct the air stream across the first surface 128 of the cathode 126.

Figure 6:
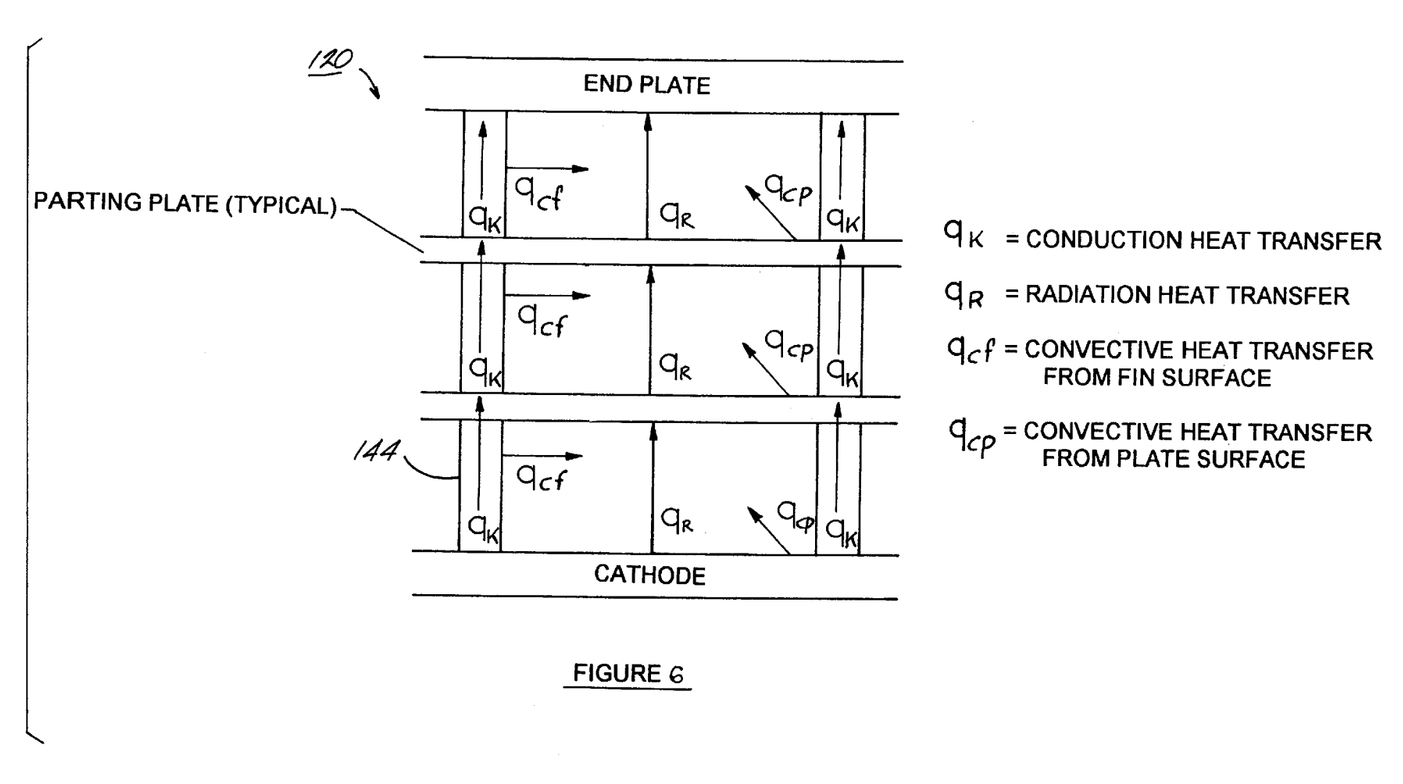
FIG. 6 shows a fragmentary cross-sectional view of the fuel cell of FIG. 3 depicting the transfer of heat to the air stream as it passes through the flow distributor, in accordance with certain preferred embodiments of the present invention.

Upon reaching the first surface 128 of the cathode 126, the air stream serves its primary function as the oxidizer in the overall electrochemical fuel cell process. Oxidation of the fuel generates heat at the first surface 128 of the cathode 126. The generated heat is transferred to the air stream before it reaches the first surface 128 of the cathode 126, as it flows through the multiple flow path levels of the distributor structure. The manner in which this overall heat transfer occurs is illustrated schematically in FIG. 6. A portion of the generated heat is transferred conductively through the fins 144 extending between the adjacent parting plates 152 and 154. A significant portion of heat is also transferred by radiation between the facing parting-plate walls of the passages. The net transfer of heat to the air stream itself occurs by convection from the hot surfaces of the parting plates 152, 154 and fins 144.

The fuel cell 120 having a flow distributor 122 with three flow path levels 146, 148, 150 shown FIGS. 3–6 is for illustrative purposes only. It is contemplated that in other preferred embodiments any number of flow path levels may be used. In certain highly preferred embodiments, an odd number of flow path levels are used to facilitate the design of the inlet and outlet headers. Similarly, although the fins 144 are shown as extending in longitudinal directions with respect to the first surface 128 of the cathode 126, they could be any of the folded-metal shapes commonly used in the fabrication of a compact plate-fin heat exchanger. The multiple level design divides the overall temperature rise in the air stream among the different parallel passages. Although temperature discontinuities may still exist within the fuel cell, these differences will be less severe and will be transferred away from the active cathode surface to a portion of the cell module where they can be accommodated more easily in the mechanical design of the structure. Thus, when operating a fuel cell having an air stream flow distributor as disclosed herein, it will be possible to provide an air stream at the first surface of the cathode that is substantially similar to the temperature of the first surface of the cathode. As a result, during the basic electrochemical operation of the fuel cell, the conditions of the cell will approach the desired isothermal condition.

Figure 7:
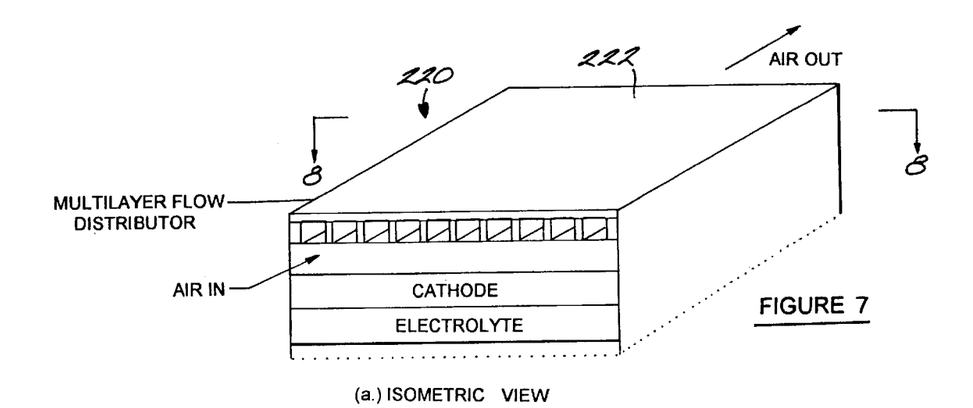
FIG. 7 shows a perspective view of a fuel cell including an oxidizing agent flow distributor in accordance with further preferred embodiments of the present invention.
Figure 8:
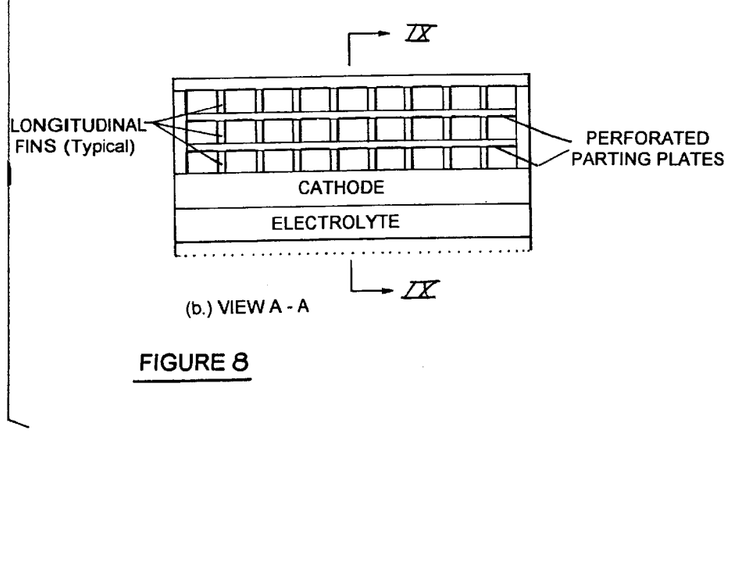
FIG. 8 shows a cross-sectional view of the fuel cell of FIG. 7 along line VIII—VIII.
Figure 9:
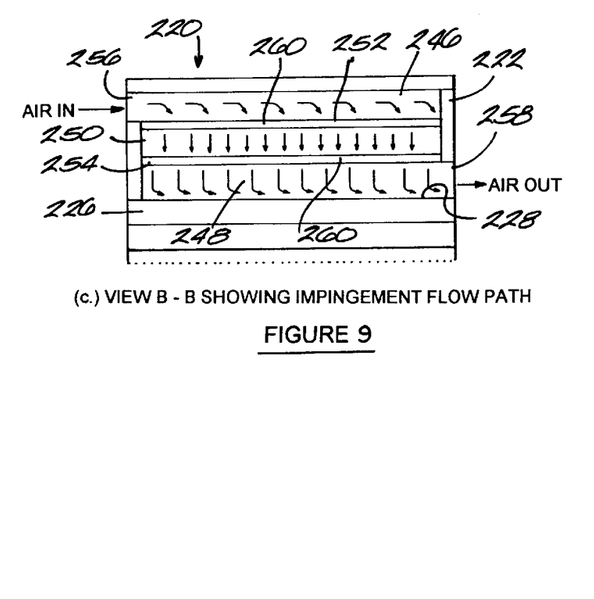
FIG. 9 shows a cross-sectional view of the fuel cell of FIG. 8 along line IX—IX.

FIGS. 7–9 show a fuel cell 220 having an oxidizing agent flow distributor 222 in accordance with further preferred embodiments of the present invention. The fuel cell disclosed in this embodiment is substantially similar to that shown in FIGS. 3–5. However, the parting plates 252, 254 shown in FIGS. 7–9 extend the full length of the flow level passages 248, 250, 252. In addition, parting plates 252, 254 include a plurality of perforations or apertures 260 extending therethrough. Referring to FIG. 8, in certain preferred embodiments, the apertures 260 are uniformly distributed throughout the parting plates 252 and 254. As shown in FIG. 9, the air stream initially enters the top flow level 246 of the distributor 222 through inlet 256 and then flows uniformly down through the apertures 260 in first parting plate 252 and into intermediate flow level 250. The individual jets of air then pass through the apertures 260 in second parting plate 254 and into the bottom flow level 248. After passing through the second parting plate 254, the air stream flows onto the first surface 228 of the cathode 226 and then exits the fuel cell through the outlet 258. When the individual jets of the air stream impinge upon the parting plates 252 and 254, heat transfer occurs between the parting plates and the air stream. Because of this impingement heat transfer, the convective coefficient is considerably enhanced resulting in a configuration which has a very high thermal effectiveness. The overall flow arrangement which is predominantly in a direction normal to the plane of the cell (i.e., the first surface 228 of the cathode 226) also preferably minimizes any longitudinal gradients in temperature and greatly improves temperature uniformity throughout the fuel cell.

Generally, the above described fuel cell provides a structure for transferring heat from the active electrode surface of the fuel cell to the incoming oxidizer and/or fuel stream in a direction normal to the active electrode surface. The generated heat is transferred to the air stream so that the temperature of the incoming air stream is warmed to a temperature that is substantially equal to the temperature of the active surface. As a result, planar temperature gradients in the cathode, which can lead to undesirable thermal stresses in the material, will be minimized because convective heat transfer at the surface is essentially eliminated. Thus, the present invention decouples the heat transfer process from the reaction process. This decoupling provides the opportunity to optimize the reaction rate and increase the efficiency of the cell without the undesirable consequence of increasing the heat transfer rate at the surface. The reaction rate is increased by increasing the mass-transfer coefficient which also increases the heat transfer coefficient. However, because the temperature of the air stream is substantially equal to the temperature at the surface, the heat transfer occurring at the surface is relatively minimal.

The manner in which the air stream or oxidizing agent is directed over the active cathode surface preferably provides two additional benefits unrelated to the considerations discussed above. First, the design of the fuel cell improves the uniformity of the concentration profile over the first surface of the cathode. Secondly, by virtue of the Reynold's analogy between heat and mass transfer, the impingement flow should increase the coefficient for convective turbulent diffusion of the oxidizing agent to the cathode surface. These design features will provide for more efficient utilization of the active surface area of the cathode as well as improve the net electrochemical efficiency of the fuel cell.

The invention has been described above in terms of a flow distributor for the air stream. However, it is contemplated that the flow distributor described in preferred embodiments of the present invention may also be applied with similar benefits to the fuel stream. In any event, the present invention provides a passive design approach that requires no modification in operating procedures or control strategies. In addition, no changes are necessary in any of the major cycle conditions or auxiliary system components. Thus, it is contemplated that implementation of the present invention will result in fuel cell systems which are considerably more durable and efficient than present fuel cell configurations.

The above disclosure describes only certain preferred embodiments of a fuel cell having a flow distributor and is not intended to limit the scope of the present invention to the exact construction and operation shown and described herein. The foregoing is considered to merely illustrate certain principles of the invention. Thus, it should be evident to those skilled in the art that numerous modifications and changes may be made to the embodiments shown herein while remaining within the scope of the present invention as described and claimed.

What is claimed is:

1. A fuel cell comprising:
   a cathode having a first surface and a second surface;
   an anode having a first surface and a second surface, said anode underlying said cathode so that the first surface of the anode faces the second surface of said cathode;
   an electrolyte sandwiched between the second surface of said cathode and the first surface of said anode;
   a fuel distributor underlying said anode for directing a flow of fuel over the second surface of said anode; and
   an oxidizing agent flow distributor having a plurality of plates for separating flow path levels, said oxidizing flow distributor being adapted for passing an oxidizing agent toward the first surface of said cathode and transferring heat from the first surface of said cathode to the oxidizing agent as said oxidizing agent moves toward said cathode so that the temperature of the oxidizing agent reaching the first surface of said cathode is increased for minimizing thermal stresses upon said fuel cell, the oxidizing agent flow distributor including:
   a top flow path level;
   a bottom flow path level underlying and in fluid communication through one or more openings with the top flow path level; and
   one or more intermediate flow path levels between the top flow path level and the bottom flow path level, the intermediate flow path levels being in fluid communication with said top and bottom flow path levels through one or more openings, wherein said oxidizing agent enters the top flow path level and flows laterally back and forth in a multi-pass arrangement through each of the succeeding flow path levels so that when said oxidizing agent reaches the bottom flow path level, said oxidizing agent flows across the first surface of the cathode for reacting with said fuel.

2. The fuel cell as claimed in claim 1, wherein said bottom flow path level directs said oxidizing agent into intimate contact with said fuel at the first surface of said cathode, thereby oxidizing said fuel and generating heat at said first surface of said cathode.

3. The fuel cell as claimed in claim 2, wherein said oxidizing agent flow distributor includes means for passing said oxidizing agent from an inlet to an outlet thereof.

4. The fuel cell as claimed in claim 1, wherein the heat generated at the first surface of said cathode is transferred to the oxidizing agent as it flows through the plurality of flow path levels of the oxidizing agent flow distributor.

5. The fuel cell as claimed in claim 4, wherein the heat generated at the first surface of said cathode is transferred by conduction through fins connecting the adjacent plates and by radiation between adjacent plates.

6. The fuel cell as claimed in claim 1, wherein said plates are substantially parallel to one another and substantially parallel to the first surface of the cathode.

7. The fuel cell as claimed in claim 1, wherein the plates separating the flow path levels include a plurality of holes for allowing the oxidizing agent entering the top flow path level to flow downward from one flow path level to the next toward the first surface of said cathode.

8. A fuel cell comprising:
   a cathode having a first surface and a second surface;
   an anode having a first surface and a second surface, said anode underlying said cathode so that the first surface of the anode faces the second surface of said cathode;
   an electrolyte sandwiched between the second surface of said cathode and the first surface of said anode;
   a fuel distributor underlying said anode for directing a flow of fuel over the second surface of said anode; and
   an oxidizing agent flow distributor having a plurality of plates for separating flow path levels, said oxidizing flow distributor being adapted for passing an oxidizing agent toward the first surface of said cathode and transferring heat from the first surface of said cathode to the oxidizing agent as said oxidizing agent moves toward said cathode so that the temperature of the oxidizing agent reaching the first surface of said cathode is increased for minimizing thermal stresses upon said fuel cell, the oxidizing agent flow distributor including:
   a top flow path level;
   a bottom flow path level; and
   one or more intermediate flow path levels being in fluid communication with said top and bottom flow path levels, wherein said oxidizing agent enters the top flow path level and flows in a first direction toward an intermediate flow path level through which the oxidizing agent flows in a second direction, the second direction being opposite the first direction, to the bottom flow path level wherein the oxidizing agent flows in the substantially same direction as the first direction across the first surface of the cathode.

* * * * *